J. KNIGHTS.
Apparatus for Attaching Horses to Vehicles.
No. 216,741. Patented June 24, 1879.

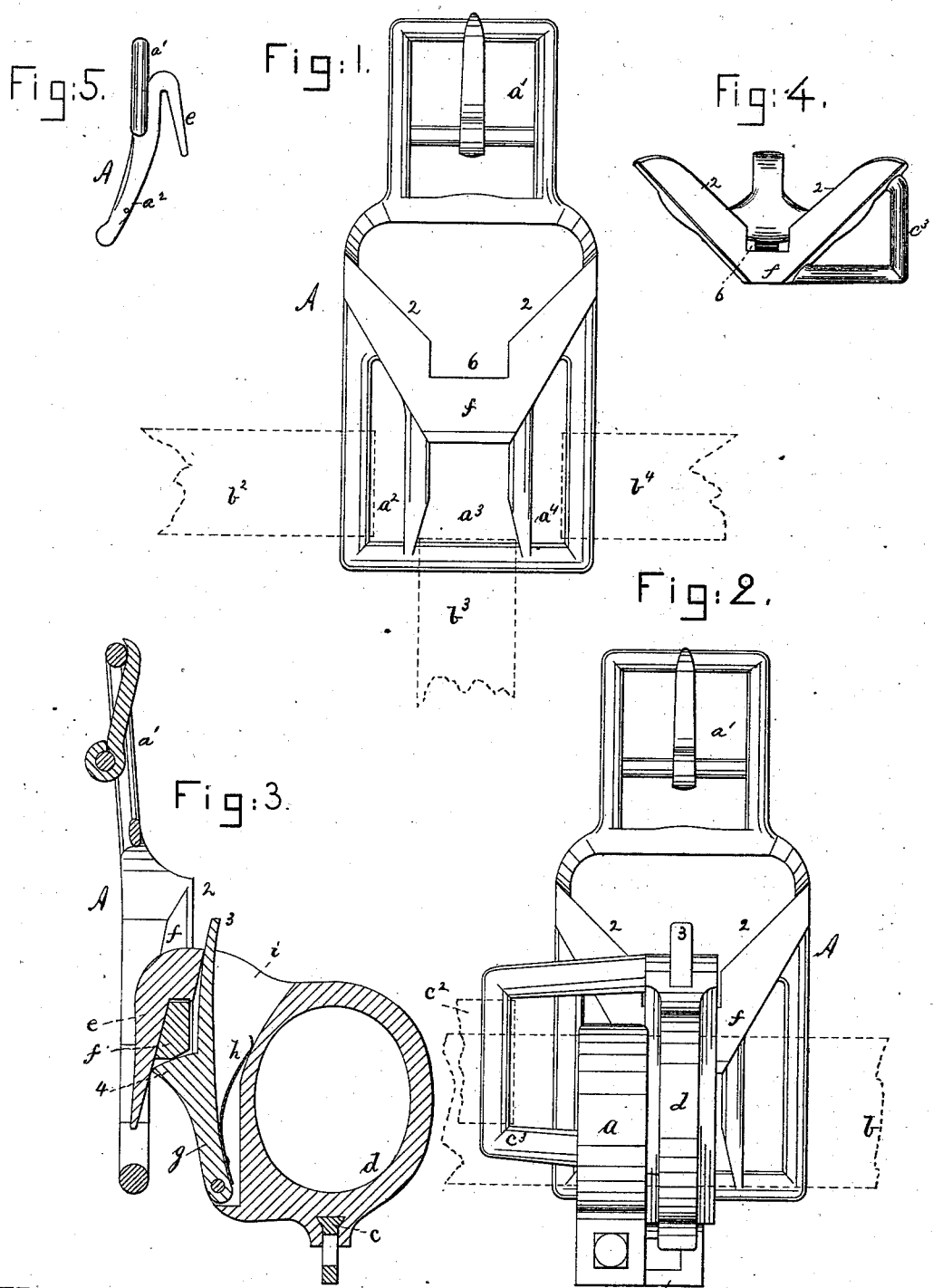

Witnesses.
Lawrence F. Connor.
Jos. P. Livermore.

Inventor.
John Knights
by Crosby & Gregory Attys

UNITED STATES PATENT OFFICE.

JOHN KNIGHTS, OF BOSTON, MASSACHUSETTS, ASSIGNOR TO ANDREW C. SCOTT, OF SAME PLACE.

IMPROVEMENT IN APPARATUS FOR ATTACHING HORSES TO VEHICLES.

Specification forming part of Letters Patent No. 216,741, dated June 24, 1879; application filed May 7, 1879.

*To all whom it may concern:*

Be it known that I, JOHN KNIGHTS, of Boston, county of Suffolk, State of Massachusetts, have invented an Improved Apparatus for Attaching Horses to Vehicles, &c., of which the following description, in connection with the accompanying drawings, is a specification.

This invention relates to an apparatus for attaching horses to shafts; the object of the invention being the production of an apparatus by which a horse can be instantaneously secured to or between the shafts of the vehicle to be drawn, or to a hose or other carriage.

In my invention a shaft-embracing metal ring, provided with a loop and a locking device co-operating with it, is adapted to be engaged with the cross-bar of a saddle loop or frame provided with eyes, to which are secured the back-straps, belly-girth, breeching-straps, and hame-tugs. The trace proper is attached at its outer end to the loop of the shaft-embracing ring.

Figure 6:
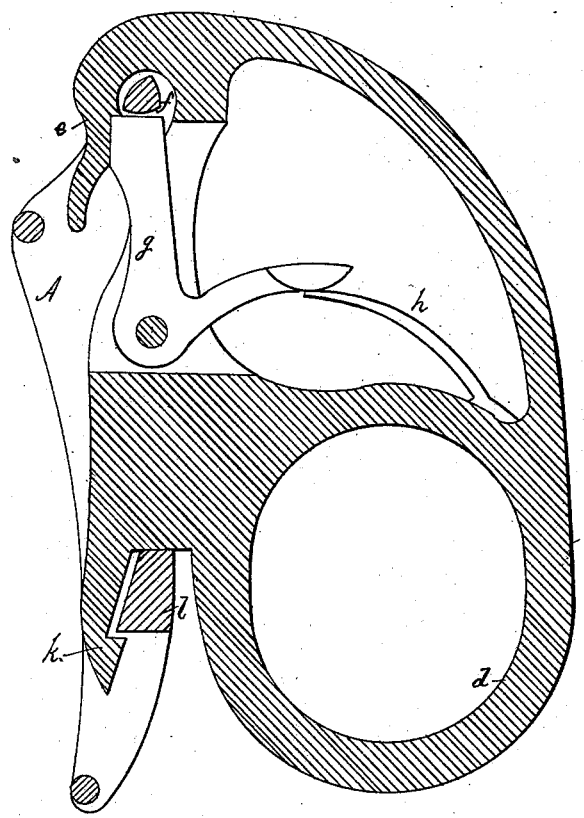
Figure 7:
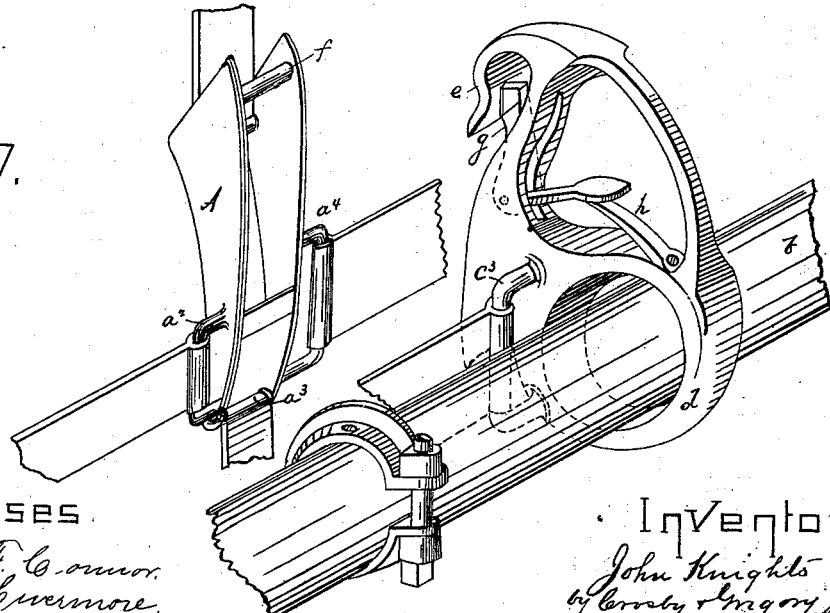

Figure 1 represents, in front elevation, the metal saddle loop or frame, which is to be supported by the usual back-strap, the dotted lines showing the other straps to be connected therewith; Fig. 2, a front elevation of the shaft-embracing ring attached to the shaft shown in dotted lines, and engaged with the saddle-loop. Fig. 3 is a central vertical section taken through Fig. 2. Figs. 4 and 5 represent a modified form of attachment, the cross-bar and hook being changed to occupy converse positions, and being inverted; and Figs. 6 and 7 represent yet another modification, to be referred to.

The shaft-clamp $a$, fixed upon the shaft $b$, (shown in dotted lines, Fig. 2,) has connected with it the ring-supporter $c$, adapted to enter a dovetailed slot made in the ring $d$, (see Figs. 2 and 3,) to hold the ring in upright position with relation to the shaft, so that when the horse is placed between the shafts and they are lifted the hook $e$ of the ring will be in proper position to be dropped or lowered and engage the cross-bar $f$ of the saddle loop or frame, (shown detached in Fig. 1,) the edges 2 of the said cross-bar, each side its central portion, being inclined to permit the hook $e$, engaged with any part of the said cross-bar, to readily and automatically drop to the central portion of the bar, this construction making it unnecessary to place the hook $e$ upon the exact center of the cross-bar, where it is to be engaged therewith.

The ring $d$ has pivoted upon it a locking device, $g$, (shown as a lever operated upon by a spring, $h$,) the said locking device being pivoted within a notch or recess, $i$, of the ring, with its upper end, 3, extended above the hook or ring, to be easily turned backward by hand when it is desired to disengage the hook from the cross-bar. This locking device has a shoulder, 4, to project under the cross-bar, and the projection passed below the cross-bar enables the inner inclined face of the hook $e$ to be held closely to the inner face of the cross-bar, (see Fig. 3,) the projection preventing the hook and ring rising, and the hook $e$, being embraced by the notched part 6 of the cross-bar, is prevented from being moved horizontally along the cross-bar.

The saddle-loop A, provided with the cross-bar, already referred to, has a buckle part, $a^1$, to receive the usual back-strap, and loops $a^2$ $a^3$ $a^4$, to receive the breeching-strap $b^2$, the belly-band or girth $b^3$, and the hame-tug $b^4$, all shown in dotted lines, Fig. 1.

The trace proper, $c^2$, (shown in dotted lines, Fig. 2, and which will be connected at its outer end with the usual whiffletree,) will be attached at its inner end to the trace-loop $c^3$, projected backwardly from the ring $d$.

The clamp $a$, besides holding the ring-supporter, also serves as the holdback-iron, to prevent the movement of the ring backward along the shaft $b$.

Instead of placing the cross-bar with its V-shaped edge upon the saddle-loop, I may place it upon a shaft-ring, $d$, as shown in Fig. 4; and to enable the hook $e$ to co-operate with it, I may place it in inverted position upon the saddle-loop, as shown in Fig. 5.

While I prefer the form of shaft-embracing ring and hook and locking device shown in Figs. 2 and 3, it is obvious that the said parts may be modified, as in Figs. 6 and 7, without departing from my invention. In these last-mentioned figures the hook $e$ of the ring, somewhat differently shaped, is caused to embrace a differently shaped cross-bar, $f$, near the top of the saddle-loop, and the locking device $g$ is made as an elbow-lever, and to the said ring I have added an auxiliary hook, $k$, which is passed or caught over an auxiliary cross-bar, $l$.

I am aware that a saddle-loop has been provided with a hook to be engaged by a trace-loop connected with the trace and holdback-strap; but the said trace-loop was not adapted to embrace or be supported by the shaft; and I am aware that a metal link supported by a back-strap has been made to embrace a shaft and enter a notch in a plate at its lower side, the said link being held in place in the said notched plate by means of a strap extended from one side of the link across above the shaft, and then down under the horse, where it is attached to the belly-girth, as in United States Patent No. 76,874, April 14, 1868; and I am also aware that a button projected from a trace-loop has been riveted to a link pivoted loosely upon the end of a bolt extended through the shaft.

In this my invention the shaft is not weakened, as by the insertion of a bolt through it, but is embraced by a ring, which makes the parts more enduring.

I claim—

1. A saddle-loop and a cross-bar having inclined edges to guide and direct the hook $e$, combined with a shaft-embracing ring and a hook to engage the said cross-bar, substantially as described.

2. The shaft-engaging ring provided with a hook, $e$, and a locking device to embrace a cross-bar, substantially as described.

3. The shaft-engaging ring provided with a trace-loop, combined with the supporting device to maintain the ring in its proper position to permit the ready engagement of the hook and cross-bar, substantially as described.

4. The clamp or holdback adapted to be secured to the shaft, and the ring-supporting device, combined with the shaft-engaging ring, hook, locking device, and cross-bar, substantially as described.

In testimony whereof I have signed my name to this specification in the presence of two subscribing witnesses.

JOHN KNIGHTS.

Witnesses:
  G. W. GREGORY,
  N. E. WHITNEY.